United States Patent
Zeng

(10) Patent No.: US 8,422,859 B2
(45) Date of Patent: Apr. 16, 2013

(54) AUDIO-BASED CHAPTER DETECTION IN MULTIMEDIA STREAM

(75) Inventor: Hong Zeng, North York (CA)

(73) Assignee: VIXS Systems Inc., Toronto, Ontario (CA)

( * ) Notice: Subject to any disclaimer, the term of this patent is extended or adjusted under 35 U.S.C. 154(b) by 397 days.

(21) Appl. No.: 12/729,378

(22) Filed: Mar. 23, 2010

(65) Prior Publication Data

US 2011/0235993 A1    Sep. 29, 2011

(51) Int. Cl.
*H04N 9/80* (2006.01)

(52) U.S. Cl.
USPC .......................................... 386/241; 386/249

(58) Field of Classification Search .................. 386/241, 386/249, 250, 251, 285
See application file for complete search history.

(56) References Cited

U.S. PATENT DOCUMENTS

| | | | |
|---|---|---|---|
| 5,430,835 A | 7/1995 | Williams |
| 5,696,866 A | 12/1997 | Iggulden et al. |
| 5,969,755 A | 10/1999 | Courtney |
| 6,061,054 A | 5/2000 | Jolly |
| 6,100,941 A | 8/2000 | Dimitrova et al. |
| 6,192,075 B1 | 2/2001 | Jeng et al. |
| 6,285,818 B1 | 9/2001 | Suito et al. |
| 6,744,729 B2 | 6/2004 | Tinsley et al. |
| 6,751,776 B1 | 6/2004 | Gong |
| 6,760,916 B2 | 7/2004 | Holtz et al. |
| 6,850,252 B1 | 2/2005 | Hoffberg |
| 6,874,160 B1 | 3/2005 | Herz |
| 6,976,031 B1 | 12/2005 | Toupai et al. |
| 7,075,990 B2 | 7/2006 | Costa |
| 7,080,392 B1 | 7/2006 | Geshwind |
| 7,116,712 B2 | 10/2006 | Vogelaar et al. |

(Continued)

FOREIGN PATENT DOCUMENTS

| | | |
|---|---|---|
| EP | 1274238 A | 1/2003 |
| GB | 2396050 A | 6/2004 |

OTHER PUBLICATIONS

Drucker, Steven M. et al., "SmarkSkip: Consumer Level Browsing and Skipping of Digital Video Content," CHI 2002, Proceedings of the SIGCHI Conference on Human Factors in Computing Systems, Apr. 2002, pp. 219-226.

(Continued)

*Primary Examiner* — Robert Chevalier

(57) ABSTRACT

A multimedia processing system identifies chapter breaks in a program represented by multimedia data through an analysis of audio content of a portion of the multimedia data so as to identify an interval that potentially represents a chapter break. This audio analysis can include an analysis to identify changes in high frequency edges in the audio content, an analysis to identify changes in the total energy in a central frequency band of the audio content, an analysis to identify patterns of sequentially repeating values in the audio content, an analysis to identify changes in bitrate, or some combination thereof. One or more variances in the audio information at (e.g., before) the start of the interval and the audio information at (e.g., after) the end of the interval then may be used to identify or otherwise characterize the interval as representing an actual chapter break. Further, a chapter represented by two consecutive chapter breaks can be identified as an advertisement based on the duration between the two consecutive chapter breaks and thus the multimedia processing device can implement a "commercial skip function" by omitting playback of the portion of the multimedia data representing the chapter responsive to the chapter being identified as an advertisement.

20 Claims, 5 Drawing Sheets

U.S. PATENT DOCUMENTS

| | | |
|---|---|---|
| 7,133,862 B2 | 11/2006 | Hubert et al. |
| 7,143,353 B2 | 11/2006 | McGee et al. |
| 7,149,957 B2 | 12/2006 | Hull et al. |
| 7,158,026 B2 | 1/2007 | Feldkamp et al. |
| 7,209,647 B2 | 4/2007 | Bruls |
| 7,232,948 B2 | 6/2007 | Zhang |
| 7,245,820 B2 | 7/2007 | McGee et al. |
| 7,272,295 B1 | 9/2007 | Christopher |
| 7,284,202 B1 | 10/2007 | Zenith |
| 7,298,962 B2 | 11/2007 | Quan et al. |
| 7,359,615 B2 | 4/2008 | Miyagoshi et al. |
| 7,558,463 B2 | 7/2009 | Jain et al. |
| 7,668,372 B2 | 2/2010 | Schiehlen |
| 7,707,485 B2 | 4/2010 | Laksono |
| 7,738,706 B2 | 6/2010 | Aradhye et al. |
| 7,739,102 B2 | 6/2010 | Bender |
| 7,787,705 B2 | 8/2010 | Sun et al. |
| 7,823,055 B2 | 10/2010 | Sull et al. |
| 7,853,865 B2 | 12/2010 | Errico et al. |
| 8,195,401 B2 | 6/2012 | Ella et al. |
| 2002/0009289 A1 | 1/2002 | Morishita et al. |
| 2002/0073424 A1 | 6/2002 | Ward et al. |
| 2002/0147782 A1 | 10/2002 | Dimitrova et al. |
| 2002/0176702 A1 | 11/2002 | Frantz |
| 2003/0002583 A1 | 1/2003 | Geerlings |
| 2003/0035481 A1 | 2/2003 | Hahm |
| 2003/0073402 A1 | 4/2003 | Herring et al. |
| 2003/0085913 A1 | 5/2003 | Ahmad et al. |
| 2003/0120831 A1 | 6/2003 | Dubil et al. |
| 2003/0123841 A1 | 7/2003 | Jeannin |
| 2003/0149559 A1 | 8/2003 | Lopez-Estrada |
| 2003/0182620 A1 | 9/2003 | James et al. |
| 2003/0202773 A1 | 10/2003 | Dow et al. |
| 2003/0210889 A1 | 11/2003 | Engle et al. |
| 2003/0229900 A1 | 12/2003 | Reisman |
| 2004/0010806 A1 | 1/2004 | Yuen |
| 2004/0024790 A1 | 2/2004 | Everett |
| 2004/0109094 A1 | 6/2004 | Lindsay et al. |
| 2004/0125877 A1 | 7/2004 | Chang et al. |
| 2004/0133559 A1 | 7/2004 | DeVorzon et al. |
| 2004/0187159 A1 | 9/2004 | Gaydos et al. |
| 2005/0022252 A1 | 1/2005 | Shen |
| 2005/0041689 A1 | 2/2005 | Wu et al. |
| 2005/0108643 A1 | 5/2005 | Schybergson et al. |
| 2005/0123001 A1 | 6/2005 | Craven et al. |
| 2005/0190794 A1 | 9/2005 | Krause et al. |
| 2005/0228649 A1 | 10/2005 | Harb et al. |
| 2005/0265395 A1 | 12/2005 | Kim et al. |
| 2005/0276567 A1 | 12/2005 | Okuyama et al. |
| 2006/0015904 A1 | 1/2006 | Marcus |
| 2006/0026294 A1 | 2/2006 | Virdi et al. |
| 2006/0080591 A1 | 4/2006 | Huang et al. |
| 2006/0095401 A1 | 5/2006 | Krikorian et al. |
| 2006/0153522 A1 | 7/2006 | Iggulden |
| 2006/0238656 A1 | 10/2006 | Chen et al. |
| 2007/0031118 A1* | 2/2007 | Fujishima et al. ............... 386/95 |
| 2007/0073904 A1 | 3/2007 | Leung et al. |
| 2007/0074097 A1 | 3/2007 | Laksono |
| 2007/0250901 A1* | 10/2007 | McIntire et al. ............... 725/146 |
| 2007/0279494 A1 | 12/2007 | Aman et al. |
| 2008/0162623 A1 | 7/2008 | Flynn et al. |
| 2009/0046873 A1 | 2/2009 | Riedl |
| 2009/0158326 A1* | 6/2009 | Hunt et al. ....................... 725/38 |
| 2009/0238264 A1 | 9/2009 | Wittig et al. |
| 2010/0145488 A1 | 6/2010 | Laksono |
| 2010/0150449 A1 | 6/2010 | Laksono |

OTHER PUBLICATIONS

Lie, Wen-Nung et al., "Combining Caption and Visual Features for Semantic Event Classification of Baseball Video," IEEE International Conference on Multimedia and Expo, Jul. 6, 2005, XP010843893, ISBN: 0-7803-0331-7; pp. 1254-1257.

* cited by examiner

AUDIO-BASED CHAPTER DETECTION IN MULTIMEDIA STREAM

FIELD OF THE DISCLOSURE

The present disclosure relates generally to multimedia processing and more particularly to chapter detection in a multimedia stream.

BACKGROUND

The arrangement of a multimedia program by chapter often facilitates viewer navigation in the multimedia program. One navigation benefit afforded by chapter detection is the ability to selectively skip chapters, particularly advertisements, or "commercials," inserted into the multimedia program. Conventional commercial detection techniques typically rely on the detection of either video scene changes or the detection of black frames set apart by a duration equivalent to a standard duration of a commercial, which typically is fifteen, thirty or sixty seconds in length. However, anti-skip measures have been instituted by content providers and service providers so as to defeat the effectiveness of these conventional commercial detection systems.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate example techniques for identifying chapter breaks in a program represented by multimedia data. In at least one embodiment, an analysis of audio content of a portion of the multimedia data is performed to identify an interval that potentially represents a chapter break. This audio analysis can include an analysis to identify changes high frequency edges in the audio content, an analysis to identify changes in the total energy in a central frequency band of the audio content that is associated with a human speech frequency range, an analysis to identify patterns of sequentially repeating values in the audio content, an analysis to identify changes in bitrate, or some combination thereof. One or more variances in the audio information at (e.g., before) the start of the interval and the audio information at (e.g., after) the end of the interval then may be used to identify or otherwise characterize the interval as representing an actual chapter break. The variances employed for this determination can include a variance in the average bitrate of the audio data, a variance in the average high frequency edge of the audio data, and the like. A multimedia processing device providing for the playback of the multimedia content represented by the multimedia data can implement trickplay functions that allow a viewer to advance playback of the multimedia content based on the identified chapter breaks. Further, a chapter represented by two consecutive chapter breaks can be identified as an advertisement based on the duration between the two consecutive chapter breaks and thus the multimedia processing device can implement a "commercial skip function" by omitting playback of the portion of the multimedia data representing the chapter responsive to the chapter being identified as an advertisement.

The term "advertisement," as used herein, refers to multimedia content which is added to, or inserted in, the primary multimedia content of a program and which typically is ancillary to the primary multimedia content. Advertisements can include, for example, commercials, public service announcements (PSAs), station identification segments, and the like.

Figure 1:
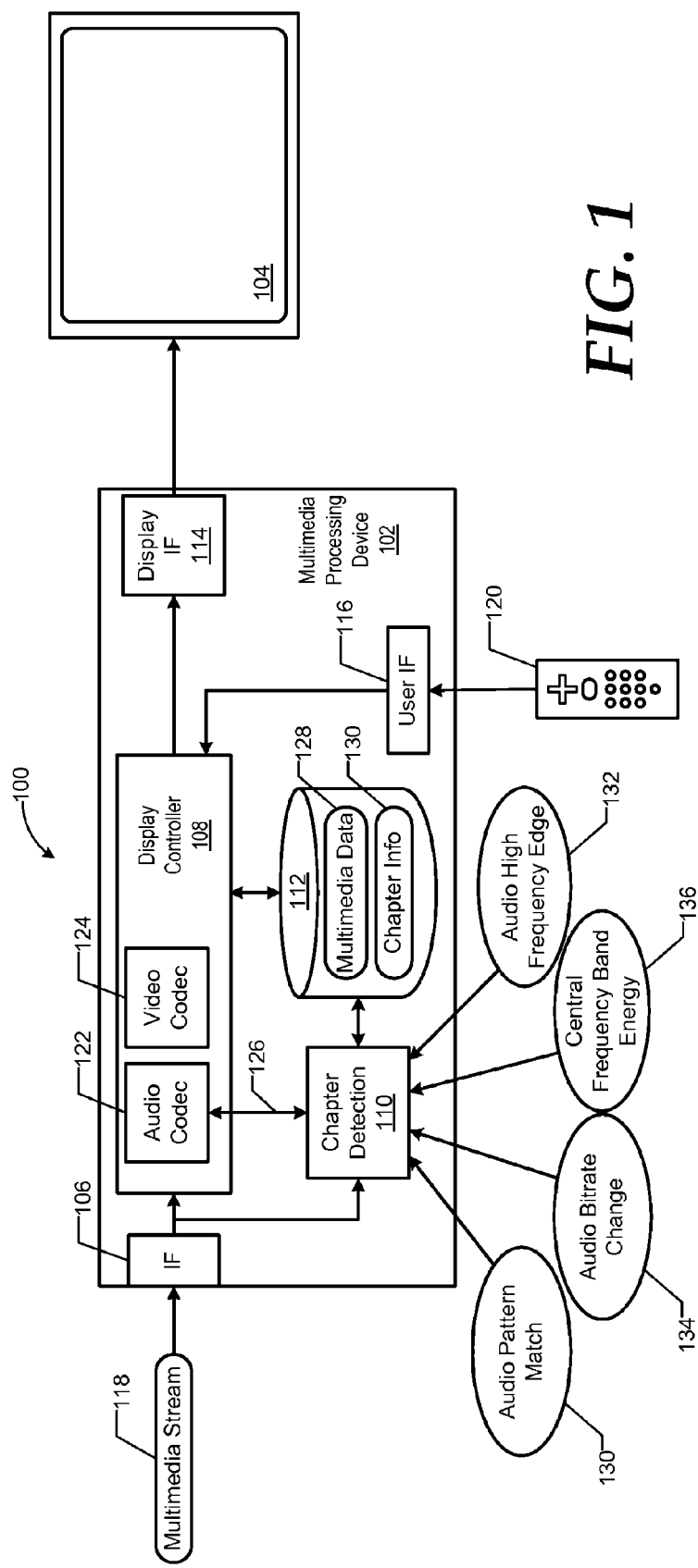
FIG. 1 is a diagram illustrating a multimedia processing system implementing a chapter detection technique that is based on audio analysis in accordance with at least one embodiment of the present disclosure.

FIG. 1 illustrates a multimedia system 100 employing a chapter detection technique in accordance with at least one embodiment of the present disclosure. The multimedia system 100 includes a multimedia processing device 102 and a display device 104, and one or more local or remote multimedia sources of a multimedia stream, such as a digital video recorder (DVR) or optical disc device (e.g., a digital versatile disc (DVD) player), a service provider (e.g., a cable or satellite television provider), an Internet source (e.g., a web page), or a locally-connected personal computer (PC) or other home entertainment device (referred to collectively as "multimedia sources"). The multimedia processing device 102 can include, for example, a digital video recorder (DVR) or other set top box (STB) device, a portable multimedia device (e.g., a multimedia-enabled cellular phone), and the like.

In the depicted example, the multimedia processing device 102 includes a source interface 106, a display controller 108, a chapter detection module 110, a storage device 112, a display interface 114, and a user interface 116. The multimedia processing device 102 implements a software and hardware environment (not shown) that manages the functions of the multimedia processing device 102 and one or more busses, switch fabrics, or other interconnects (not shown) for signaling and transportation of content and command information between functional components of the multimedia processing device 102. Some or all of the functionality of the components of the multimedia processing device 102 can be implemented in hardware as one or more application-specific integrated circuits (ASICs), field programmable gate arrays (FPGAs) or other hardware-implemented state machines, and the like. Some or all of the functionality of the components can be implemented via one or more processors executing software configured to manipulate the one or more processors and related peripheral circuitry to perform the ascribed functionality. Further, some or all of the functionality may be implemented as a combination of application-specific hardware and software/processor-based processing. An example software/processor-based implementation is discussed in greater detail below with reference to FIG. 5.

The source interface 106 is configured to receive a multimedia stream 118 from a multimedia source. To illustrate, the source interface 106 could include a High-Definition Multimedia Interface (HDMI)-type interface to connect to a DVR, a network interface (e.g., an Ethernet interface) to connect to a network gateway (e.g., a cable modem or a digital subscriber line (DSL) line), or a wireless interface (e.g., an IEEE 802.11 interface) to connect to a home multimedia center. The user interface 116 comprises any of a variety of remote control interfaces (e.g., a radio frequency (RF) interface or an infrared interface, etc.) or panel interfaces configured to receive user input from, for example, a remote control device 120 and to provide the user input to the display controller 108. The user input can include any of a variety of navigation commands, such as a play command, a pause command, a chapter advance command, a commercial skip command, and the like.

The display controller 108 includes one or more multimedia processing engines for processing the incoming multimedia stream 118 in accordance with a specified encoding format so as to render display content and audio content for output to the display device 104. For example, the display controller 108 can include a Motion Pictures Experts Group (MPEG)-2 or MPEG-4 decoder or H.264 encoder for incoming MPEG or H.264 streams, a National Television Standards Committee (NTSC) receiver or an Advanced Television Systems Committee (ATSC) receiver for multimedia streams transmitted in accordance with the NTSC standard or the ATSC standard, respectively. As another example, the multimedia processing engine can include a processor and software (or hardware-based implementation) configured to decode incoming multimedia content encoded in accordance with any of a variety of video file formats, such as the Audio Video Interleave (AVI) format, the Google™ Video (GVI) format, the Apple™ Quicktime™ format, the RealPlayer™ streaming video format, and the like. The display content and audio content generated by the display controller 108 is provided to the display interface 114, which generates corresponding control signaling so as to control the display device 104 to display the corresponding display content and to audibly output the corresponding audio content.

In one embodiment, the display controller 108 includes an audio coder-decoder (codec) 122 and a video codec 124. The audio codec 122 and the video codec 124 process the audio data and the video data, respectively, of the multimedia stream 118 in preparation for playback of the multimedia content represented by the multimedia stream 118. This processing can include decoding encoded audio data and video data, transcoding audio data and video data, rendering video data to display data, converting digital audio data to corresponding analog signaling, and the like. Further, the audio codec 122 is configured to at least partially decode the audio data so as to determine audio spectrum information 126 for the audio data and provide the audio spectrum information 126 for the audio content of the multimedia stream 118 to the chapter detection module 110 for use in detecting chapter breaks in the multimedia content represented by the multimedia stream 118.

The storage device 112 stores multimedia data 128 representative of the multimedia stream 118. The multimedia data 128 can include data of the multimedia stream 118 prior to processing by the display controller 108, data generated as a result of the processing of the multimedia stream 118 by the display controller 108, or a combination thereof. The storage device 112 can include any of a variety of disk drives or memories, such as a magnetic disc drive, an optical disc drive, a random access memory, a flash memory, a cache, a buffer, and the like.

The chapter detection module 110 operates to identify chapter breaks in the multimedia content represented by the multimedia data 128 and to generate chapter information 130 specifying the location of the identified chapter breaks in the multimedia data 128. The chapter information 130 further can include information identifying the type of chapter found between two current chapter breaks, such as information characterizing a chapter as an advertisement or a non-advertisement. The chapter information 130 then is stored to the storage device 112 in association with the multimedia data 128. To illustrate, in one embodiment, the chapter information 130 is embedded in the multimedia data 128, such as by embedding chapter break indicators in a transport stream layer or an elementary stream layer of the multimedia data 128. As another example, the chapter information 130 could be arranged into a table or other data structure that identifies a particular time or time range for each identified chapter break, which identifies a particular frame that marks the start or end of each identified chapter break, and the like.

In processing the multimedia data 128 for output to the display device 104, the display controller 108 can use the corresponding chapter information 130 to facilitate navigation through the represented multimedia content. To illustrate, the display controller 108 can use the chapter breaks identified by the chapter information 130 to advance through chapters in response to user input. As another example, the display controller 108 can implement a commercial skip function by omitting playback of chapters identified by the chapter information 130 as advertisements. The display controller 108 can implement this commercial skip function as a default setting or in response to a user input via the user interface 116.

The chapter detection module 110 identifies chapter breaks based on audio analysis of the multimedia data 128. The audio analysis identifies one or more indicia indicating a discontinuity in the audio content. Such discontinuities indicate potential chapter transitions. To illustrate, the transition from one chapter to the next chapter often is marked by a period of a constant noise or sound, particularly for a transition to an advertisement or from an advertisement. As this constant sound would be represented by the same audio data value repeated sequentially a number of times, the audio analysis performed by the chapter detection module 110 can include a repeating pattern analysis 130 that detects a particular minimum number of sequential audio frames or other blocks of audio data that include a specified bit pattern.

As another example, the audio data for commercials other ancillary content inserted into a program often is encoded using different techniques, different encoding systems, or different encoding parameters than the main audio content of the program. These different approaches often result in changes in the highest audio frequency, referred to herein as the "high frequency edge," from one chapter to the next chapter. Accordingly, the audio analysis performed by the chapter detection module 110 can include an audio high frequency edge analysis 132 that detects changes in the high frequency edges in the audio spectrum information 126 at various points in the playback sequence of the audio data.

As yet another example, the bitrate of the audio data often changes between chapters due to the changes in the substance of the audio content presented with each chapter. Accordingly, the audio analysis performed by the chapter detection module 110 can include an audio bitrate analysis 134 that detects changes in the bitrate_in the analyzed audio data at various points in the playback sequence of the audio data.

As a further example, the human speech content often changes between chapters, such as when switching from one scene with one set of actors speaking to the next scene with a different set of actors speaking or such as when switching between a scene in the primary content of a program and an inserted advertisement. Accordingly, the audio analysis performed by the chapter detection module 110 can include an audio central frequency band energy analysis 136 that detects changes in the total energy in a frequency band associated with human speech (identified herein as the "central frequency band"). The human speech frequency range generally is recognized as the frequency band from approximately 300 hertz to approximately 3 kilohertz. However, any of a variety of frequency ranges associated with human speech can be implemented.

The analyses 130, 132, 134, and 136 can be used in various combinations to identify a particular interval of the audio content that potentially represents a chapter break, as well as to identify whether an identified interval represents an actual chapter break. The combination of one or more of these analyses used to identify an interval can be the same as or different than the combination of one or more of these analyses used to characterize a so-identified interval as representing an actual chapter break. To illustrate, in one embodiment the audio central frequency band energy analysis 136 is used to identify an interval as potentially representing a chapter break, whereas the identification of the potential chapter break as an actual chapter break is based on the repeating pattern analysis 130, the audio high frequency edge analysis 132, and the audio bit rate analysis 134.

Figure 2:
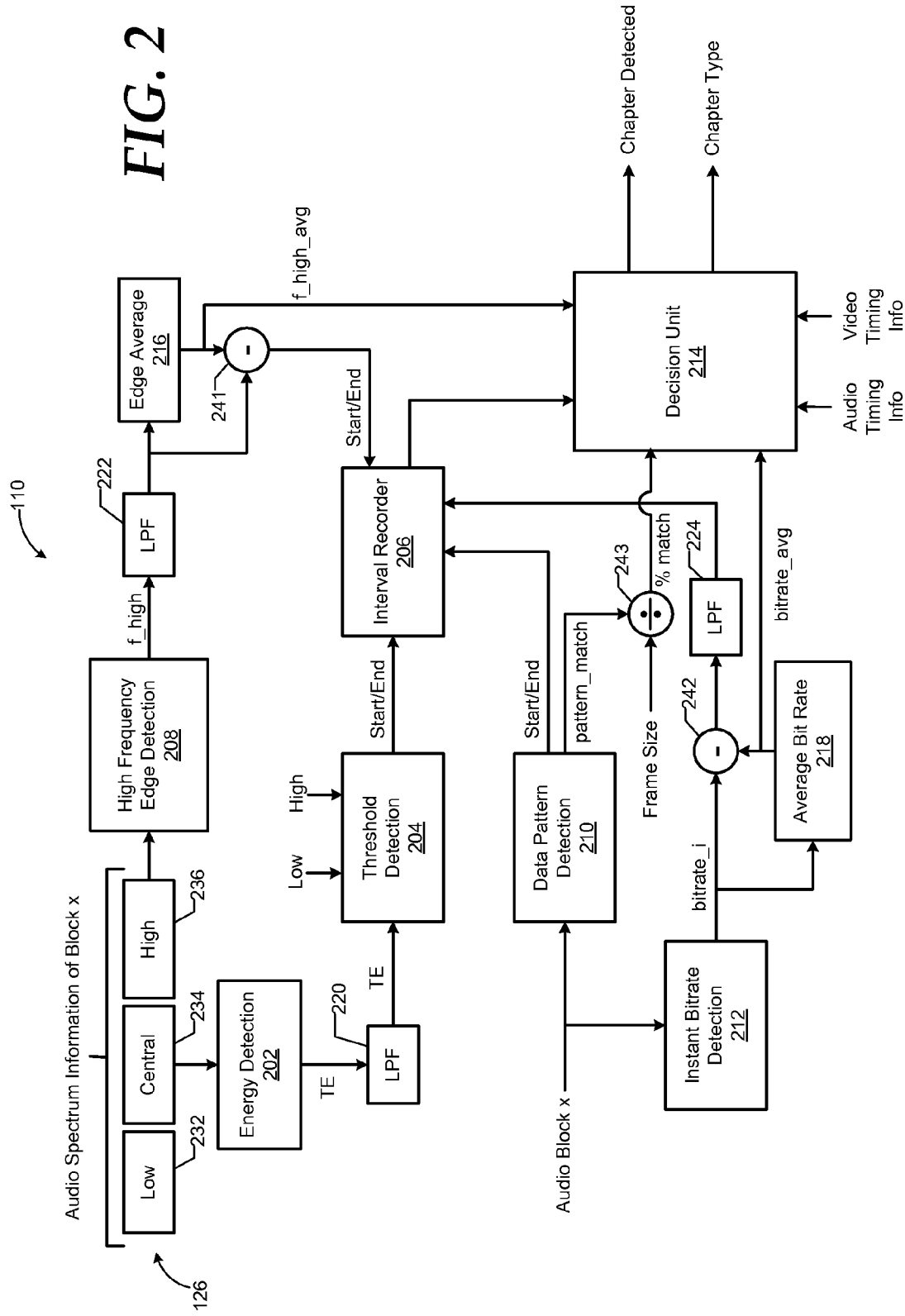
FIG. 2 is a diagram illustrating a chapter detection module of the multimedia processing system of FIG. 1 in accordance with at least one embodiment of the present disclosure.

FIG. 2 illustrates an example implementation of the chapter detection module 110 of the multimedia processing device 102 of FIG. 1 in accordance with at least one embodiment of the present disclosure. In the illustrated implementation, the chapter detection module 110 includes an energy detection module 202, a threshold detection module 204, an interval recorder module 206, a high frequency edge detection module 208, a data pattern detection module 210, an instant bit rate detection module 212, a decision unit 214, an high frequency edge averaging module 216, a bitrate averaging module 218, and low pass filters (LPFs) 220, 222, and 224. These components can be implemented as application specific hardware, as one or more processors executing software in association with corresponding peripheral hardware, or combinations thereof. For example, in one embodiment one or more of the components of the chapter detection module 110 can be implemented as one or more processors in conjunction with a computer readable medium (e.g., a memory, cache, optical disk drive, or a hard disk) to store a program of instructions, whereby the program of instructions is executable by the one or more processors to manipulate the one or more processors so as to perform the functionality described herein. As another example, some or all of the modules can be at least partially implemented as one or more logic-based hardware state machines to implement the techniques described herein.

Figure 3:
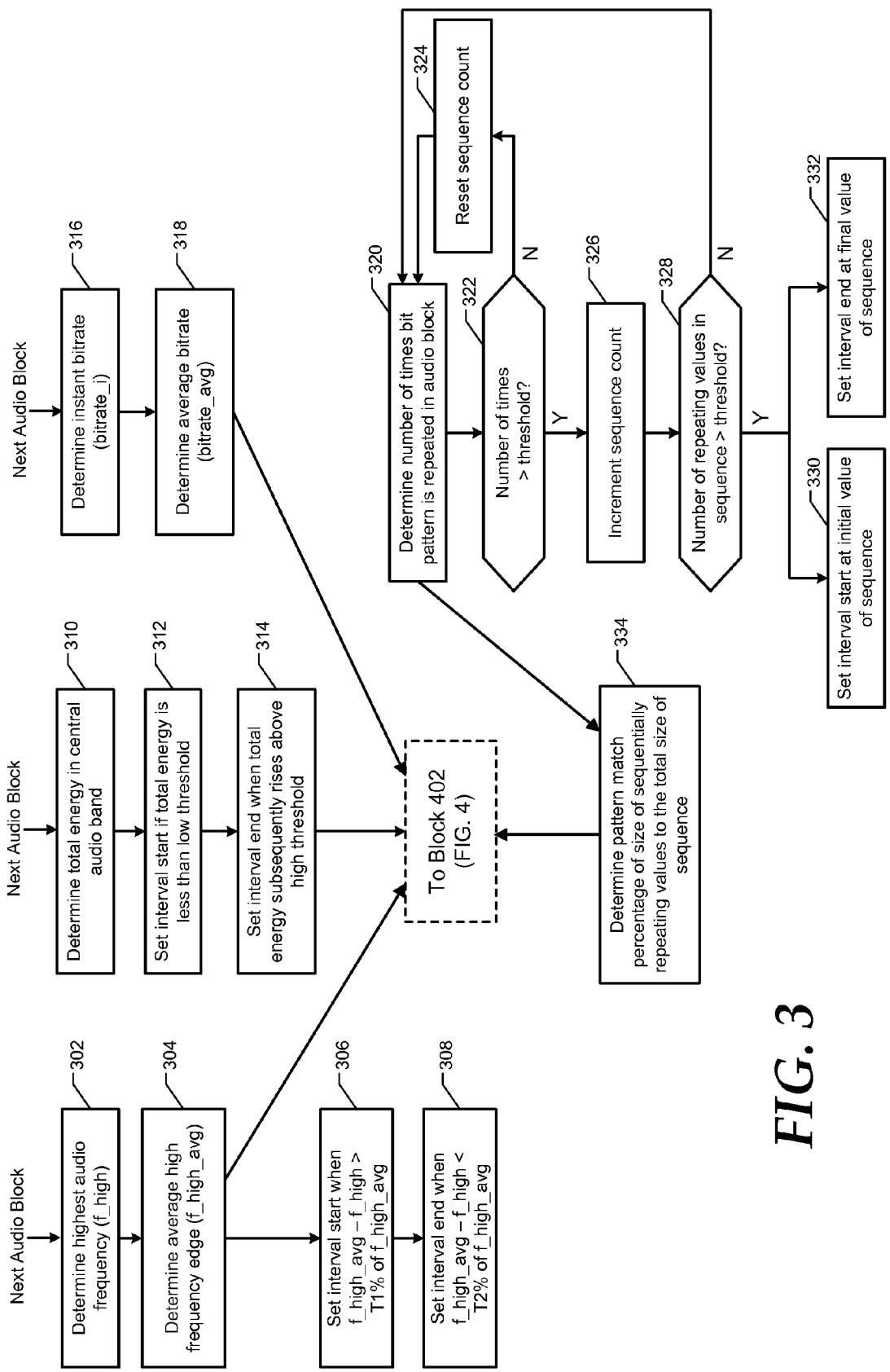
FIG. 3 is a method for performing an audio analysis of a multimedia stream to identify an intervals potentially representing a chapter break in accordance with at least one embodiment of the present disclosure.
Figure 4:
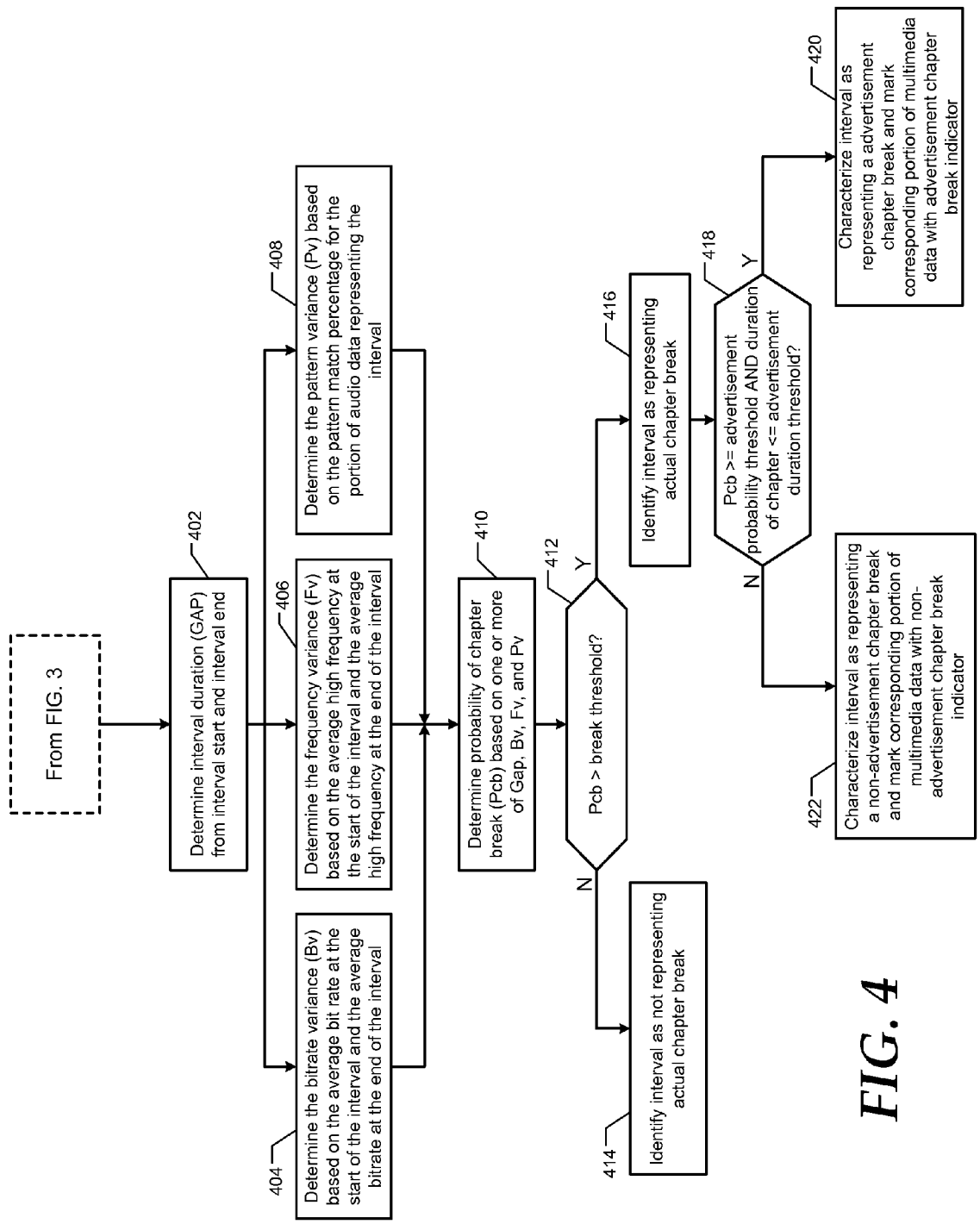
FIG. 4 is a method for characterizing an interval detected in a multimedia stream as representing an actual chapter break based on the audio analysis of the method of FIG. 3 in accordance with at least one embodiment of the present disclosure.

FIGS. 3 and 4 illustrate an example method of operation of the implementation of chapter detection module 110 of FIG. 2 in accordance with at least one embodiment of the present disclosure. In particular, FIG. 3 illustrates an example technique employed by the chapter detection module 110 in performing audio analyses of the audio data for identifying an interval of the multimedia content as potentially representing a chapter break, as well as for determining the characteristics of the audio content leading up to the interval and following the interval, as well as including the interval. As described above, the audio codec 122 partially or fully decodes the audio content of the multimedia data 128 to determine the audio spectrum information 126 for each block of audio data relative to the playback sequence of the audio content. Each block of audio data can include, for example, an audio frame, which typically includes 1024 audio samples. The chapter detection module 110 separates the audio spectrum information 126 for each block relative to a specified human speech frequency range, such as by separating the audio spectrum information into low frequency band information 232 for audio spectrum information at frequencies below, for example, 300 Hz, central frequency band information 234 for audio spectrum information at frequencies between, for example, 300 Hz and 3 kHz, and high frequency band information 236 for audio spectrum information at frequencies higher than, for example, 3 kHz.

At block 302, the high frequency edge detection module 208 receives the high frequency band information 236 for a block "x" of audio data and determines the highest audio frequency present in the block using the high frequency band information 236. A value f_high[x] representing the highest audio frequency, or "high frequency edge," of the block x is provided to the high frequency edge averaging module 216, which then updates an average high frequency edge value f_high_avg[x] using the value f_high[x] and the previous value of the value f_high_avg[x−1] at block 304. The averaging technique implemented by the high frequency edge averaging module 216 can include a weighted averaging, a window averaging, and the like. In at least one embodiment, the value f_high[x] can be filtered using the low pass filter 222 so as to provide a smoothing of the high frequency data before it is used in updating the average high frequency edge value f_high_avg[x].

As described above, different encodings may be implemented between chapters, and as each encoding may have a different highest frequency implemented, a change in the high frequency edge may signal a chapter break. Accordingly, in one embodiment, the chapter detection module 110 compares (as represented by a subtraction module 241 in FIG. 2) the highest frequency f_high for a block being analyzed with the average high frequency edge value f_high_avg. If_highest frequency f_high of the block of audio data is less than the high frequency edge value f_high_avg by at least a predetermined threshold T1 (e.g., T1=30% of f_high_avg) (that is, if f_high drops to (0.3×f_high_avg) or lower), at block 306 the interval recorder module 206 marks the point in the playback sequence associated with the block of audio data as the start of an interval. After marking a block as the start of an interval, the process of blocks 302 and 304 continues for subsequent blocks of audio data. If the highest frequency f_high of a subsequent block of audio data then rises to within a second predetermined threshold T2 (e.g., T2=50% of f_high_avg) (that is, if f_high rises to (0.5×f_high_avg) or higher), at block 308 the interval recorder module 206 marks the point in the playback sequence associated with this subsequent block of audio data as the end of the interval. Thus, in this instance the interval is defined by the duration between the block i of audio data for which f_high_avg[i]−f_high[i]>T1 and the subsequent block j of audio data for which f_high_avg[j]−f_high[j]<T2.

As described above, the human speech content often changes between chapters, and particularly between primary content and advertising content, and thus the central frequency band associated with human speech frequencies can be analyzed to identify intervals of the multimedia content that represent potential chapter breaks. In particular, chapter breaks often are either substantially devoid of sound (that is, relatively silent) or at least substantially devoid of sound in the human speech range. Accordingly, rather than setting the start and end of an interval based on an analysis of the high frequency edges of the audio data, in an alternative embodiment intervals instead are determined based on an analysis of the changes the total energy of the central frequency band of the audio information. In this instance, at block 310 the energy detection module 202 determines the total energy in the central frequency band for the block x of audio data based on the central frequency band information 234 for the block x. At block 312, the energy detection module 202 provides a value TE[x] representing the determined total energy to the threshold detection module 204. In one embodiment, the low pass filter 220 is used for smoothing of the TE values. In the event that the value TE[x], or a smoothed representation thereof, falls below a predetermined low threshold (and thus indicative of the start of a substantially constant interval in the audio content), at block 312 the threshold detection module 204 signals the interval recorder module 206 to mark the point in the playback sequence associated with the block x as the start of an interval. After marking a block as the start of an interval, the process of block 310 repeats for one or more subsequent blocks of audio data. If the total energy value TE of a subsequent block of audio data then rises above a high threshold, at block 314 the interval recorder module 206 marks the point in the playback sequence associated with this subsequent block of audio data as the end of the interval. Thus, in this instance the interval is defined by the duration between the block i of audio data for which TE[i]<low threshold and the subsequent block j of audio data for which TE[j]>high threshold. To illustrate, in a context of the total energy range being represented as a 32-bit value, the low threshold can be set to, for example, a value of 3000 and the high threshold can be set to, for example, a value of 8000.

In at least one embodiment, the characterization of an identified interval as representing an actual chapter break is based at least in part on an analysis of the change in bitrate at the interval. Accordingly, at block 316 the instant bitrate detection module 212 determines the instant bitrate for the block x and provides a value bitrate_i[x] representative of the instant bitrate to the bitrate averaging module 218. At block 318, the bitrate averaging module 218 updates an average bitrate value bitrate_avg[x] using the value bitrate_i[x] and the previous value of the value bitrate_avg[x−1]. The averaging technique implemented by the bitrate averaging module 218 can include a weighted averaging, a window averaging, and the like. As with the other analyses described herein, a comparison of the instant bitrate and the average bitrate can be used to identify the start of an interval. To illustrate, an interval start can be recorded by the interval recorder 206 when the instant bit rate differs from the average bitrate by, for example, 20% or more.

As noted above, the audio content of a transition between chapters often is characterized as a relatively constant noise. This relatively constant noise is manifested in the audio data as the repeating of a bit pattern in each audio frame of a sequence of audio frames. Characterization of an interval as representing an actual chapter break thus can be based on a repeating pattern analysis of the audio data. Accordingly, rather than using the total energy of the central frequency band 234 or the high frequency edges of the high frequency band 236 to identify an interval, the repeating pattern analysis can be used to identify the interval in addition to using the repeating pattern analysis to characterize an interval as representing an actual chapter break. In this instance, a sequence of audio frames is identified as an interval that potentially represents a chapter break when each audio frame of the sequence has a bit pattern (e.g., a byte value) that is repeated at least a threshold number of times and when the sequence of audio frames has a threshold number of audio frames. The threshold number of times a bit pattern is repeated and the threshold number of sequential audio frames having repeating bit pattern are selected in an effort to avoid mistakenly identifying random periods of relatively constant sound within a chapter as a potential chapter break.

At block 320 the data pattern detection module 210 compares each incoming byte of an audio frame received in the playback sequence with the previous byte in the audio frame to determine a number of times a byte value (e.g., the bit pattern) is sequentially repeated in the audio frame. After processing the audio frame, at block 322 the data pattern detection module 210 compares the number of times a byte value is repeated in the audio frame with a bit pattern repeat threshold (e.g., seven). If any byte value is repeated in repeated in the audio frame more than the bit pattern repeat threshold (e.g., six or less), at block 324 a sequence count is reset. Otherwise, at block 326 the sequence count is incremented to reflect that the audio frame has a repeating bit pattern meeting the bit pattern repeat threshold. At block 328 the data pattern detection module 210 determines whether a number of sequential audio frames having a repeating bit pattern, as represented by the sequence count, is greater than the threshold number of audio frames. If not, the process returns to block 320 for the next audio frame. Otherwise, if the number of sequential audio frame is greater than the threshold, at block 332 the data pattern detection module 210 signals the interval recorder module 206 to mark the point in the playback sequence associated with the initial audio frame in the sequence of audio frames as the start of an interval and at block 334 the data pattern detection module 210 signals the interval recorder module 206 to mark the final audio frame of the sequence as the end of the interval. Further, for an identified sequence of audio frames having repeating bit patterns, at block 334 the data pattern detection module 210 determines a pattern match percentage value pattern_match[x] for the block x as a proportion or percentage of the number of sequentially repeated byte values within the sequence of audio frames compared to a total number of byte values in the sequence of audio frames (as represented by the division module 243 of FIG. 2).

FIG. 4 illustrates an example technique employed by the chapter detection module 110 in characterizing an interval identified through a process described above with reference to FIG. 3 as an actual chapter break. FIG. 4 further illustrates an example technique employed by the chapter detection module 110 in determining whether an identified chapter break is an advertisement chapter break, based on the characteristics of the audio content determined in the method of FIG. 3.

At block 402, the decision unit 214 receives information regarding an identified interval from the interval recorder module 206 and determines a value GAP representative of the duration of the interval, that is, from the start of the interval to the end of the interval. In one embodiment, the value GAP is determined based on a value frame_num representing the number of frames in the interval and based on a minimum expected duration GAP_min for a chapter break in the program. For example, it may be determined that the minimum duration for a chapter break is 10 frames, or approximately 400 milliseconds of content for a frame rate of 24 frames/second. The value GAP can be determined through one or more calculations represented by an expression:

$$GAP = \frac{\text{frame\_num}}{\text{GAP\_min}}$$

In one embodiment, values of GAP greater than 1 are normalized to 1; that is, if GAP is greater than 1, then GAP is set to 1.

As described above, intervals may be separately identified through different audio analyses of the same portion of the audio content and thus there may be multiple candidate intervals. To illustrate, the process of blocks 306 and 308 may identify a candidate interval based on the audio high frequency edge analysis 132, the process of blocks 310, 312, and 314 may identify another candidate interval based the audio central band energy analysis 136, and the process of blocks 324, 326, and 328 may identify yet another candidate interval based on the data pattern analysis 130. Accordingly, the decision unit 214 may select the interval to be used from a plurality of candidate intervals based on a ranking or prioritization. To illustrate, the audio central band energy analysis 136 may be deemed to be the most reliable technique for identifying an interval and thus the interval identified by the audio central band energy analysis 136, if present, is selected over other candidate intervals.

After identifying the duration GAP of the interval, the decision unit 214 then determines the variances in one or more characteristics of the audio content between a point at a start of the interval and a point at the end of the interval. The point at the start of the interval can include either the last block of audio data prior to the start of the interval or the initial block of audio data that falls within the interval. Similarly, the point at the end of the interval can include either the last block of audio data to fall within the interval or the first block of audio data following the end of the interval. In one embodiment, decision unit 214 considers the variance in the bitrate. Accordingly, at block 404 the decision unit 214 accesses the buffered average bitrate value bitrate_avg[A] for the block A of the audio data corresponding to a point at the start of the interval and accesses the buffered average bitrate value bitrate_avg[B] for the block B of the audio data corresponding to a point at the end of the interval. The decision unit 214 then determines a bitrate variance Bv for the interval based on the difference between these two average bitrates. For example, the bitrate variance Bv can be determined through one or more calculations represented by an expression:

$$Bv = \left| \frac{\text{bitrate\_avg}[A] - \text{bitrate\_avg}[B]}{\text{bitrate\_avg}[A]} \right|$$

In one embodiment, the variance in the high frequency edge is considered by the decision unit 214. Accordingly, at block 406 the decision unit 214 accesses the buffered average high frequency edge value f_high_avg[A] for the block A of the audio data corresponding to a point at the start of the interval and accesses the buffered average high frequency edge value f_high_avg[A] for the block B of the audio data corresponding to a point at the end of the interval. The decision unit 214 then determines a frequency variance Fv for the interval based on the difference between these two average high frequency edges. For example, the frequency variance Fv can be determined through one or more calculations represented by an expression:

$$Fv = \left| \frac{\text{f\_high\_avg}[A] - \text{f\_high\_avg}[B]}{\text{f\_hig\_avg}[A]} \right|$$

Further, in one embodiment the pattern match percentage of the interval is considered by the decision unit 214. Accordingly, at block the decision unit 214 accesses the buffered pattern match percentage value pattern_match for the segment of the audio data corresponding to the interval. The decision unit 214 then determines a pattern match variance Pv for the interval based the pattern_match value. For example, the pattern variance Pv can be determined through one or more calculations represented by an expression:

$$Pv = K + w \times \text{pattern\_match}$$

In one embodiment, a value of Pv greater than 1 is normalized to 1, the value for the constant K is between 0 and 1 (e.g., K=0.5), and the weighting constant w is 1.

At block 410, the decision unit 214 determines the probability Pcb that the interval represents an actual chapter break based on the duration GAP of the interval and based on one or more of the variances By, Fv, and Pv. In one embodiment, the probability Pcb is calculated as a weighted sum of a combination of the values GAP, By, Fv, and Pv. To illustrate, the probability Pcb can be determined through one or more calculations represented by an expression:

$$Pcb = w1 \times GAP + w2 \times Bv + w3 \times Pv + w4 \times Fv$$

In one embodiment, the weighting constants w1, w2, w3, and w4 can range from 0 to 1. To illustrate, an example implementation of the expression above is:

$$Pcb = 0.5 \times GAP + Bv + Pv + Fv$$

Note that a weighting value of 0 for a corresponding variance has the effect of excluding consideration of the corresponding variance in identifying an interval as a potential chapter break.

After determining the probability Pcb that the interval represents a chapter break, at block 412 the decision unit 214 identifies whether the probable chapter break is an actual chapter break based on a comparison of the probability Pcb to a predetermined threshold. The predetermined threshold can be determined in any of a variety of manners, such as via empirical analysis, and may be based on the values used for the weighting constants in the expressions above. In one embodiment, a threshold of 0.5 is used in an implementation whereby the weighting constant w1 and the constant K is 0.5, the weighting constants w2, w3, and w4 are 1, and the value GAP and the variance Pv are normalized to 1.

In the event that the probability Pcb is less than the predetermined threshold, at block 414 the decision unit 214 identifies the interval as not representing an actual chapter break and the process of FIG. 4 may be repeated for the next identified interval in the audio content. Otherwise, if the probability Pcb is greater than the break threshold, at block 416 the decision unit 214 characterizes the interval as representing an actual chapter break. Accordingly, the decision unit 214 then determines whether the chapter break is an advertisement chapter break. To this end, the decision unit 214 determines the duration of the chapter represented by the chapter break. In one embodiment, the duration of the chapter is calculated as the duration between the chapter break identified at block 416 and either the chapter break preceding the considered chapter break in the playback sequence going backward) or the chapter break following the considered chapter break in the playback sequence (going forward). That is, the duration of the chapter associated with the chapter break is calculated as the duration between the chapter break and a preceding or following adjacent chapter break. The decision unit 214 then compares the probability Pcb to an advertisement probability threshold and compares the duration of the chapter to an advertisement duration threshold. The advertisement probability threshold typically is higher than the threshold used at block 410 so as to reduce the likelihood of mistakenly identifying a chapter in the primary program content as an advertisement chapter. To illustrate, in a conservative approach, the advertisement probability threshold is set to 1. Likewise, the advertisement duration threshold is selected as a relatively low value consistent with conventional advertisement durations so as to reduce both the likelihood of mistakenly identifying primary program content as advertisement content as well as the impact if such a mistaken identification is made. For example, because advertisements conventionally are 15, 30, or 60 seconds, the advertisement duration threshold can be set to 60 seconds.

In the event that both the probability Pcb is greater than or equal to the advertisement probability threshold and the duration of the chapter is not greater than the advertisement duration threshold, at block 420 the decision unit 214 characterizes the interval as representing an advertisement chapter break. The decision unit 214 further generates the chapter information 130 so as to mark the portion of the multimedia data 128 corresponding to the interval with an indicator that the portion of the multimedia data 128 represents an advertisement chapter break. Otherwise, at block 422 the decision unit characterizes the interval as representing a non-advertisement chapter break and generates the chapter information 130 so as to mark the portion of the multimedia data 128 with an indicator that the portion of the multimedia data represents a non-advertisement chapter break.

With chapter breaks identified in the multimedia data 128 in accordance with the process of FIGS. 3 and 4, the multimedia processing device 102 can implement trickplay navigation among the chapters delineated by the chapter breaks. Further, the multimedia processing device 102 can implement a commercial skip function using the advertisement chapter breaks identified in the multimedia content. To illustrate, an advertisement may be skipped by omitting playback of the multimedia content that is between the initial intra-coded frame (I-frame) of one interval characterized as representing an advertisement chapter break and the last I-frame of the next interval characterized as representing an advertisement chapter break.

As noted above, the components of the multimedia processing device 102 of FIGS. 1-4 can be implemented as hardware. However, in addition to hardware implementations adapted to perform the functionality in accordance with one of the embodiments of the present disclosure, such modules may also be embodied in one or more processors configured to execute instructions in software disposed, for example, in a computer usable (e.g., readable) medium configured to store the software (e.g., a computer readable program code). The program code causes the enablement of embodiments of the present invention, including the following embodiments: (i) the functions of the devices and methods disclosed herein (such as devices and methods upscaling/deinterlacing video); (ii) the fabrication of the devices and methods disclosed herein (such as the fabrication of devices that are enabled to upscale or deinterlace video); or (iii) a combination of the functions and fabrication of the devices and methods disclosed herein.

For example, this can be accomplished through the use of general programming languages (such as C or C++), hardware description languages (HDL) including Verilog, Verilog-A, HDL, VHDL, Altera HDL (AHDL) and so on, or other available programming and/or schematic capture tools (such as circuit capture tools). The program code can be disposed in any known computer usable medium including semiconductor, magnetic disk, optical disk (such as CD-ROM, DVD-ROM) and as a computer data signal embodied in a computer usable (e.g., readable) transmission medium (such as a digital, optical, or analog-based medium).

It is understood that the functions accomplished and/or structure provided by the systems and techniques described above can be represented in a core (such as a GPU core) that is embodied in program code and may be transformed to hardware as part of the production of integrated circuits.

Figure 5:
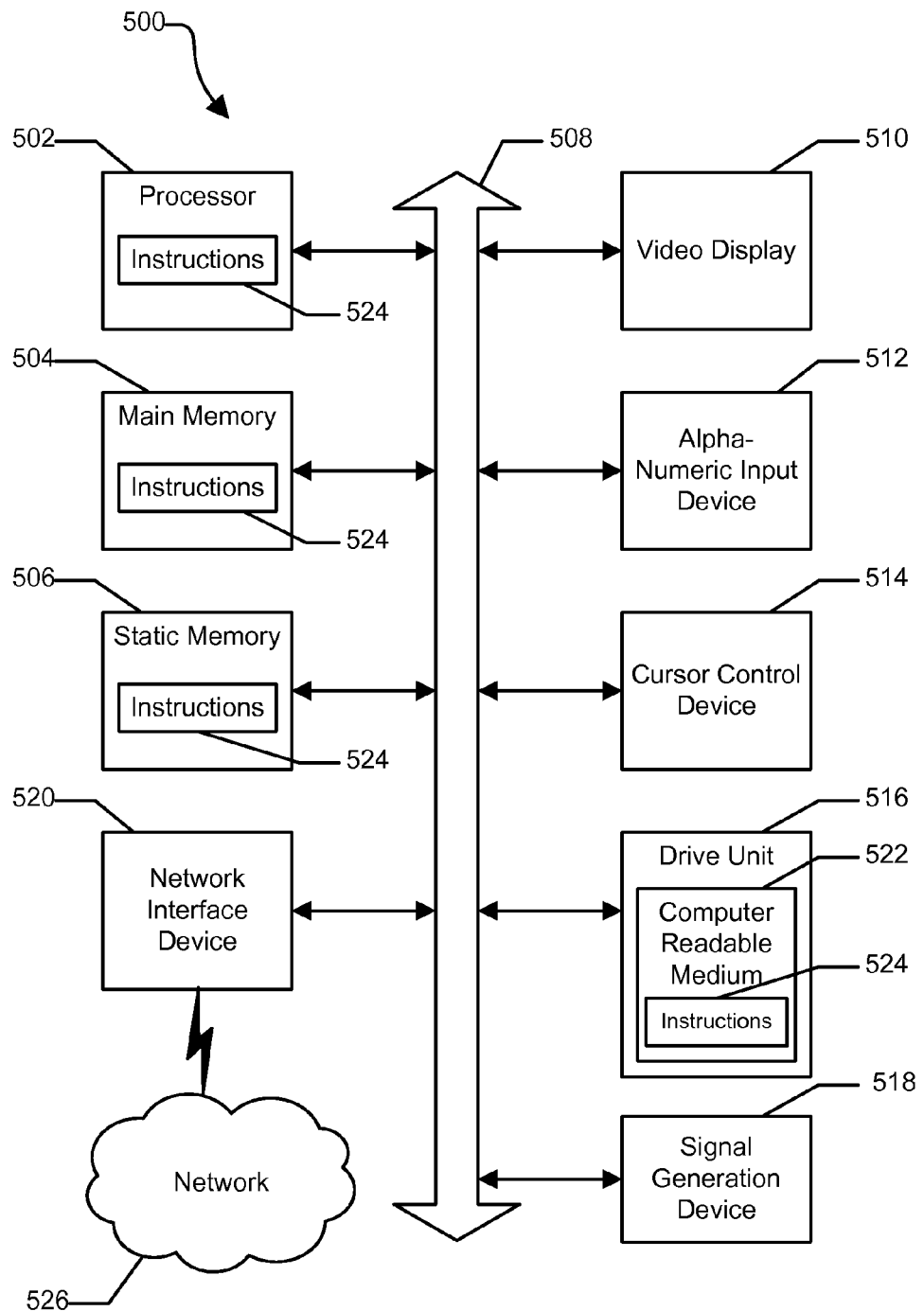
FIG. 5 is a diagram illustrating an example processor device for implementing the multimedia processing device of FIG. 1 in accordance with at least one embodiment of the present disclosure.

FIG. 5 illustrates a processing system 500 in accordance with at least one embodiment of the present disclosure. The processing system 500 can include a set of instructions that can be executed to manipulate the processing system 500 to perform any one or more of the methods or functions disclosed herein. The processing system 500 may operate as a standalone device or may be connected, e.g., using a network, to other processor devices or peripheral devices.

In a networked deployment, the processor device may operate in the capacity of a server or as a client user computer in a server-client user network environment, or as a peer processor device in a peer-to-peer (or distributed) network environment. The processing system 500 can also be implemented as or incorporated into, for example, a portable display device. Further, while a single processing system 500 is illustrated, the term "system" shall also be taken to include any collection of systems or sub-systems that individually or jointly execute a set, or multiple sets, of instructions to perform one or more computer functions.

The processing system 500 may include a processor 502, e.g., a central processing unit (CPU), a graphics processing unit (GPU), or both. Moreover, the processing system 500 can include a main memory 504 and a static memory 506 that can communicate with each other via a bus 508. As shown, the processing system 500 may further include a video display unit 510, such as a liquid crystal display (LCD), an organic light emitting diode (OLED), a flat panel display, a solid state display, or a cathode ray tube (CRT). Additionally, the processing system 500 may include an input device 512, such as a keyboard, and a cursor control device 514, such as a mouse. The processing system 500 can also include a disk drive unit 516, a signal generation device 518, such as a speaker, and a network interface device 520.

In a particular embodiment, as depicted in FIG. 5, the disk drive unit 516 may include a computer readable storage device 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the processing system 500. The main memory 504 and the processor 502 also may include computer readable media. The network interface device 520 can provide connectivity to a network 526, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and processor devices. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented, in whole or in part, by software programs executable by a processor device. The present disclosure contemplates a computer readable storage device that includes instructions or receives and provides instructions for execution responsive to a propagated signal, so that a device connected to a network can communicate voice, video or data over the network 526. Further, the instructions 524 may be transmitted or received over the network 526 via the network interface device 520.

In one embodiment, rather than being software instructions that directly implement the functionality described herein, the instructions 524 instead can implement design instructions representative of a hardware implementation of the above-described functionality that are then synthesized to determine the electrical and electronic design for a processing device that implements the above-described invention. To illustrate, these hardware-design instructions can include register transfer level (RTL) instructions, Verilog instructions, and the like.

While the computer readable storage device is shown to be a single storage device, the term "computer readable storage device" includes a single storage device or multiple storage devices, such as a centralized or distributed database, and/or associated caches and servers that store one or more sets of instructions. The term "computer readable storage device" shall also include any storage device that is capable of storing a set of instructions for execution by a processor or that cause a processor device to perform any one or more of the methods or operations disclosed herein.

In a particular embodiment, the computer readable storage device can include a solid-state memory such as a memory card or other package that houses one or more non-volatile read-only memories. Further, the computer readable storage device can be a random access memory or other volatile re-writeable memory. Additionally, the computer readable storage device can include a magneto-optical or optical medium. Accordingly, the disclosure is considered to include any one or more of a computer readable storage device or a distribution medium and other equivalents and successor media, in which data or instructions may be stored.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. In a multimedia processing device, a method comprising:
   identifying an interval in a multimedia stream as potentially representing a chapter break in a program represented by the multimedia stream; and
   characterizing the interval as representing an actual chapter break responsive to at least one variance in audio data of the multimedia stream between a point at a start of the interval and a point at an end of the interval, the at least one variance comprising at least one of: a variance in average bitrate of the audio data; and a variance in average highest frequency of the audio data.

2. The method of claim 1, wherein identifying the interval comprises:
   identifying the start of the interval as a first time corresponding to a point at which a total energy of a central frequency band of the audio data falls below a first threshold, the central frequency band being associated with a human speech frequency range; and
   identifying the end of the interval as a second time corresponding to a point at which the total energy of the central frequency band of the audio data subsequently rises above a second threshold, the second threshold greater than the first threshold.

3. The method of claim 1, wherein identifying the interval comprises:
   identifying the start of the interval as a first time corresponding to a point at which a difference between a high frequency edge of the audio data and a corresponding average high frequency edge of the audio data exceeds a first threshold; and
   identifying the end of the interval as a second time corresponding to a point at which a difference between a subsequent high frequency edge of the audio data and a subsequent corresponding average high frequency edge of the audio data falls below a second threshold.

4. The method of claim 1, wherein identifying the interval comprises:
   determining a sequence of audio frames greater than a threshold number of audio frames, each audio frame of the sequence comprising a byte value that is sequentially repeated in the audio frame at least a threshold number of times;
   identifying the start of the interval as a first time corresponding to an initial audio frame of the sequence; and
   identifying the end of the interval as a second time corresponding to a final audio frame of the sequence.

5. The method of claim 1, wherein characterizing the interval as representing an actual chapter break comprises characterizing the interval as representing an advertisement chapter break further responsive to a duration between the interval and another chapter break that precedes or follows the interval relative to a playback sequence of the multimedia stream.

6. The method of claim 5, further comprising:
   responsive to characterizing the interval as representing an advertisement chapter break, marking an initial intra-coded frame of the multimedia stream that falls within the interval as a start of an advertisement and marking as an end of the advertisement a final intra-coded frame of the multimedia stream that falls within a following interval that is characterized as representing an advertisement chapter break.

7. The method of claim 1, wherein characterizing the interval as representing an actual chapter break comprises characterizing the interval as representing an actual chapter break responsive to the variance in average bitrate and the variance in average high frequency edge.

8. The method of claim 1, wherein characterizing the interval as representing an actual chapter break comprises characterizing the interval as representing an actual chapter break further responsive to a number of sequentially repeating values in a portion of the audio data corresponding to the interval.

9. The method of claim 1, wherein characterizing the interval as representing an actual chapter break comprises characterizing the interval as representing an actual chapter break responsive to a number of sequentially repeating values in a portion of the audio data corresponding to the interval, responsive to the variance in average bitrate, and responsive to the variance in average high frequency edge.

10. The method of claim 1, wherein characterizing the interval as representing an actual chapter break characterizing the interval as representing an actual chapter break further responsive to a duration of the interval.

11. The method of claim 1, wherein characterizing the interval as representing an actual chapter break comprises characterizing the interval as representing an actual chapter break based on a weighted sum of a value representing the variance in average bitrate, a value representing the variance in average highest frequency, a value representing a duration of the interval, and value representing a proportion of a number of repeating values in a portion of the audio data corresponding to the interval to a total number of values in the portion of the audio data.

12. A multimedia processing device comprising:
a chapter detection module to identify an interval in a multimedia stream as potentially representing a chapter break in a program represented by the multimedia stream and to characterize the interval as representing an actual chapter break responsive to at least one variance in audio data of the multimedia stream between a point at a start of the interval and a point at the end of the interval, the at least one variance comprising at least one of: a variance in average bitrate of the audio data; and a variance in average highest frequency of the audio data.

13. The multimedia processing device of claim 12, wherein the multimedia processing device is to identify the interval based on at least one of: an analysis of total energies of in a central frequency band of the audio data, the central frequency band being associated with a human speech frequency range; an analysis of highest frequency edges of the audio data; and an analysis of sequentially repeating values in the audio data.

14. The multimedia processing device of claim 12, wherein the multimedia processing device is to characterize the interval as representing an actual chapter break further responsive to a number of sequentially repeating values in a portion of the audio data corresponding to the interval.

15. The multimedia processing device of claim 12, wherein the chapter detection module further is to characterize the interval as representing an advertisement chapter break responsive to a duration between the interval and another chapter break that precedes or follows the interval relative to a playback sequence of the multimedia stream.

16. The multimedia processing device of claim 15, further comprising:
a storage device to store the multimedia stream; and
wherein, in response to characterizing the interval as representing an advertisement chapter break, the chapter detection module is to store chapter information to the storage device in association with the multimedia stream, the chapter information identifying a first portion of the multimedia stream corresponding to the interval as an advertisement chapter break.

17. The multimedia processing device of claim 16, further comprising:
a display processing module to process the multimedia stream for playback, wherein the display processing module is to omit playback of multimedia content represented by a second portion of the multimedia stream responsive to the chapter information, the second portion of the multimedia stream following the first portion of the multimedia stream relative to the playback sequence.

18. In a multimedia processing device, a method comprising:
identifying a first interval of a multimedia stream as potentially representing a first chapter break based on an analysis of audio data of the multimedia stream;
identifying a second interval of the multimedia stream as potentially representing a second chapter break based on the analysis of audio data, the second interval following the first interval in a playback sequence of the multimedia stream;
characterizing the first interval as a first advertisement chapter break based on a duration of the first interval, a variance in an average bit rate of audio data of the multimedia stream at a start of the first interval and an average bit rate of audio data of the multimedia stream at an end of the first interval, a variance in an average high frequency edge of audio data at the start of the first interval and an average high frequency edge of audio data at the end of the first interval, and a number of sequentially repeating values in the audio data for the first interval; and
characterizing the second interval as a second advertisement chapter break based on a duration of the second interval, a variance in an average bit rate of audio data at a start of the second interval and an average bit rate of audio data at an end of the second interval, a variance in an average high frequency edge of audio data at the start of the second interval and an average high frequency edge of audio data at the end of the second interval, and a number of sequentially repeating values in the audio data for the second interval.

19. The method of claim 18, further comprising:
omitting playback of a portion of the multimedia stream that is between the first interval and the second interval in the playback sequence responsive to characterizing the first interval as the first advertisement chapter break and characterizing the second interval as the second advertisement chapter break.

20. The method of claim 18, wherein the first and second intervals are identified as potentially representing chapter breaks based on at least one of: an analysis of a total energies of in a central frequency band of the audio data, the central frequency band being associated with a human speech frequency range; an analysis of highest frequency edges of the audio data; and an analysis of percentages of sequentially repeating values in the audio data.

* * * * *